United States Patent

[11] 3,553,499

[72] Inventor Hugh C. Maguire
Acton, Mass.
[21] Appl. No. 745,487
[22] Filed July 17, 1968
[45] Patented Jan. 5, 1971
[73] Assignee Sperry Rand Corporation
a corporation of Delaware

[54] FAST-ACTING AVALANCHE MODE TRANSISTOR SWITCH
4 Claims, 3 Drawing Figs.

[52] U.S. Cl. .......... 307/302, 174/78, 174/88; 317/234
[51] Int. Cl. .......... H01l 1/14
[50] Field of Search .......... 317/101CC; 234/4; 313/318, 331; 307/268; 333/96, 97; 317/234; 307/302; 174/88

[56] References Cited

UNITED STATES PATENTS

| | | | |
|---|---|---|---|
| 2,409,640 | 10/1946 | Moles | 333/96 |
| 3,041,504 | 6/1962 | Lacan | 317/101 |
| 3,250,851 | 5/1966 | Boening | 317/101 |
| 3,405,287 | 10/1968 | Miller | 307/302 |

*Primary Examiner*—Jerry D. Craig
*Attorney*—S. C. Yeaton

ABSTRACT: A transistor suitable for operation in the avalanche mode is connected in a switching circuit through coaxial lines. The outer conductors of the coaxial lines are electrically bonded to a base member and the center conductors of the coaxial lines are bored out to receive the ends of the transistor leads directly.

INVENTOR
HUGH C. MAGUIRE
BY
S. C. Yeaton
ATTORNEY

FAST-ACTING AVALANCHE MODE TRANSISTOR SWITCH

BACKGROUND OF THE INVENTION

This invention relates to electrical switches and more specifically to switches for producing flat topped pulses having extremely short rise times.

The need for signal sources capable of producing fast pulses has intensified in recent years.

Various sources have been developed to satisfy this need. In some circuits, avalanche transistors have been used in circuits employing lumped constant energy storage. These sources are capable of producing short pulses but are not capable of operation in a steady state mode. Furthermore, these sources frequently produce spurious "ringing" modes so that a fast rising, clean pulse is difficult to obtain.

Still other pulse sources use tunnel diodes as switching elements. These devices, however, are limited to low voltage outputs.

It is an object of the present invention to provide a switch having a simple construction that can produce relatively high voltage pulses with fast rise times.

It is another object of the present invention to provide a fast acting switch that can operate directly into a desired load impedance.

SUMMARY OF THE INVENTION

The present invention achieves the desired objects by providing a special mount for an avalanche transistor in which any impedance mismatch is rendered negligible by inserting the transistor leads directly into specially prepared coaxial cables and using the distributed capacity of such cable to provide energy storage.

BRIEF DESCRIPTION OF THE DRAWINGS

The principles of the invention can be understood by referring to the following description and the accompanying drawings in which.

DESCRIPTION OF THE PREFERRED EMBODIMENT

Figure 1:
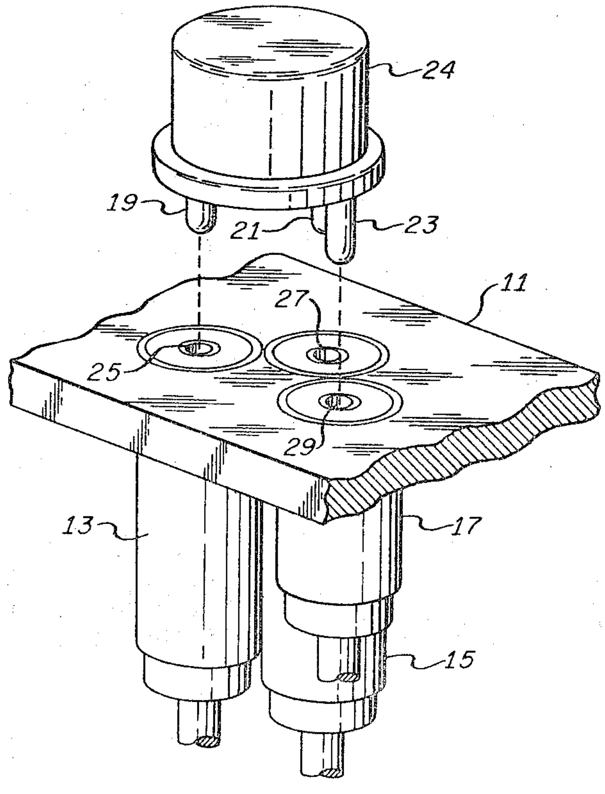
FIG. 1 is a sketch illustrating the manner in which a transistor may be mounted in practicing the invention.

Referring now to FIG. 1, a typical transistor mount includes an electrically conducting mounting element 11. Three coaxial cables 13, 15 and 17 are inserted through apertures in the mounting element 11 and the ends of these cables are trimmed so as to be flush with the upper surface of the element 11. The cables are clustered in a trefoil configuration so as to match the spacing of the transistor leads 19, 21 and 23 of the transistor 24. The ends of the center conductors 25, 27 and 29 are bored out to receive the corresponding transistor leads.

Figure 2:
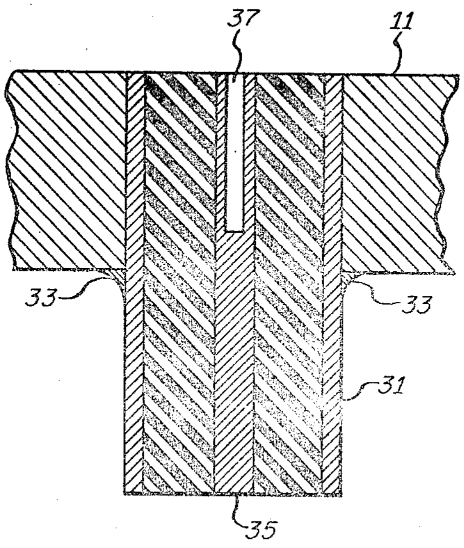
FIG. 2 is a cross-sectional view of an end of a coaxial cable illustrating the manner in which the cable is prepared to receive the transistor leads in practicing the invention.

The manner in which the ends of each cable are prepared to receive the transistor lead may be visualized by referring to FIG. 2. A hole is formed in the mounting element 11 so that the cable may be fitted into the aperture with a relatively tight fit. The outer conductor 31 of the cable thus makes a low resistance electrical contact with the base element. A soldered or conductive resin bond such as the fillet 33 may be used to further improve this electrical connection. The cable selected has a center conductor 35 whose diameter is somewhat larger than the diameter of the transistor lead to be accommodated. This permits the center conductor to be bored out so as to serve as a socket for the transistor lead. The bore 37 is also dimensioned to receive the transistor lead with a relatively tight friction fit. This fit provides good electrical contact, but permits the transistor to be replaced if necessary. Furthermore, the depth of the bore 37 is dimensioned so that when a transistor lead is bottomed in the bore 37, the transistor will be positioned at a desired location above the mounting element 11.

In a particular switch intended for operation with a 50 ohm load, the transistor leads had nominal diameters of .017 inch with a tolerance of ±.001 inch. These leads were cut to a length of .145 inch. The center conductor of each coaxial cable was bored out so as to have a diameter of .016 inch and a depth of .125 inch. Thus, when the transistor leads are fully inserted in the bores of the coaxial cables there is a slight gap between the bottom of the transistor and the top of the mounting element 11. Since the collector element of the transistor used in this switch is internally connected to the case, this gap isolates the case from the grounded element 11.

Figure 3:
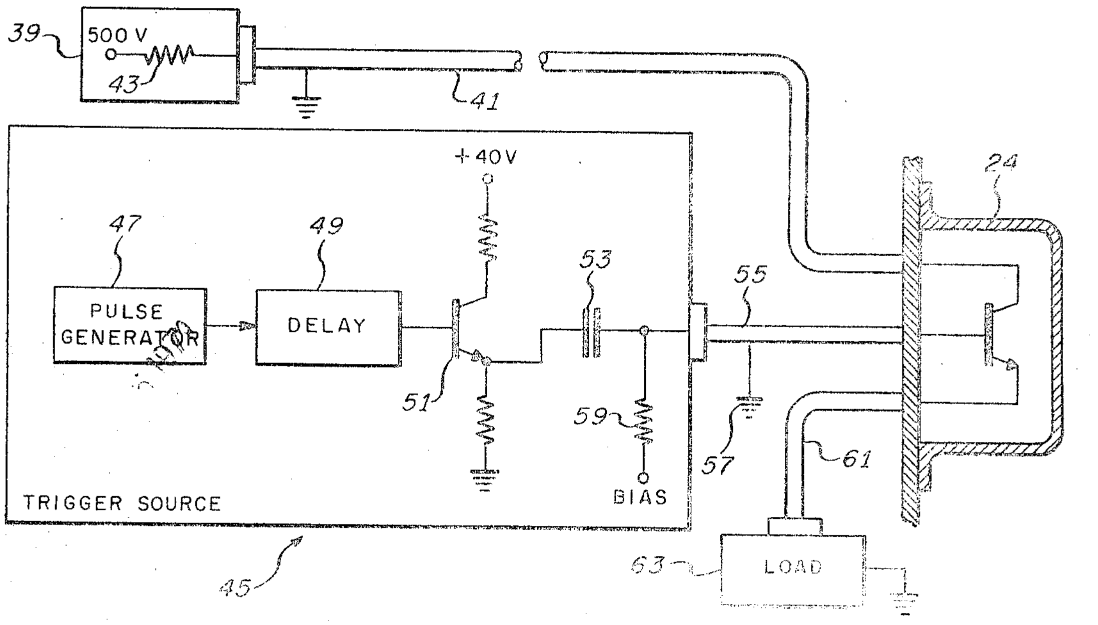
FIG. 3 is a diagram illustrating the construction of a switch built in accordance with the principles of the invention.

The circuit in which this particular transistor mount is used is illustrated in FIG. 3. The transistor is a commercially available type 2N2481. This is a switching transistor capable of operation in the avalanche mode. The transistor element is encapsulated in a standard JEDEC TO-18 case. The spacing of the transistor leads in this type of case is such that commercially available semirigid coaxial cables may be grouped in a trefoil arrangement so as to be closely aligned with the transistor leads.

The voltage for the collector element of the transistor is supplied from a voltage source 39. The voltage source in the particular application provides a DC voltage of 500 volts. This is applied to the coaxial line 41 through a series dropping resistor 43. The coaxial line 41 was cut to a length of 10 feet so as to provide significant distributed capacitance which can be discharged to supply a burst of energy when the transistor is fired. The remote end of the coaxial cable 41 thus can be coupled directly to the voltage source 39 and the transistor end of the cable 11 can be coupled directly to the transistor 20 thus providing a minimum of impedance discontinuity at either end of the coaxial line.

The base element of the transistor 20 is driven by a trigger source 45. The trigger source contains a pulse generator 47. The pulse generator may, for instance, contain a single shot multivibrator for single pulse operation or a free running, synchronized multivibrator for repetitive pulse operation. The output of the pulse generator is delayed in a delay element 49 and used to trigger a driver transistor 51. The output of the driver transistor is coupled through a blocking capacitor 53 to the center conductor of a coaxial line 55. The output of the coaxial line 55 is grounded at a ground point 57. The center conductor of the coaxial line 55 is maintained at a suitable bias voltage through a resistor 59 so that the base element of the transistor 24 may be maintained in the normally cutoff condition. The emitter element of the transistor 24 is connected directly to a coaxial cable 61. The remote end of the cable 61 is coupled directly to a load 63.

Because the transistor leads are inserted directly into the center conductors of the coaxial cables, impedance discontinuities are minimized. Transistor signals can be coupled directly to auxiliary components without any transformers or other impedance matching devices.

In this particular switching circuit, standard semirigid coaxial cables having an outside diameter of .085 inches are used. The cables have a characteristic impedance of 50 ohms and can therefore be coupled directly to the desired load of this magnitude. Tests on the circuit revealed no significant "ringing." Consequently, the output pulse was clean and had an extremely sharp rise time. In one series of tests, output voltages were obtained that had a rise time of 110 picoseconds, and a peak voltage of 19.2 volts.

In some situations, the diameter of standard coaxial cables is comparatively large so that a trefoil cluster of such cables will provide center-to-center spacings that are slightly larger than the corresponding spacing of the transistor leads. In such situations, the transistor leads may be bent slightly outwards to fit into the bores of the appropriate coaxial cables.

In one test, for instance, the ends of the transistor leads were bent outwards .015 inches so that the leads could be inserted into the bores of the coaxial cables. The transistor was then urged into place so that the transistor leads were slightly doglegged. Measurements of the pulse output of the resulting circuit revealed a ringing of no more than 5 percent.

The switching transistor 24 may be secured in its mount by any suitable means. In the circuit previously described, a dielectric pressure plate was mounted over the transistor so as to provide a downward force that serves to hold the transistor in place.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A fast-acting switch comprising a transistor capable of operation in the avalanche mode; said transistor being encapsulated in a cylindrical case and having three connecting leads projecting from one end thereof, said leads being arranged in a triangular configuration; individual coaxial cables corresponding to each transistor lead; a transistor end and a remote end on each coaxial cable; a center conductor in each coaxial cable having an axial bore at its transistor end, said center conductor having a uniform diameter larger than the diameter of the transistor leads, said axial bore receiving the corresponding transistor lead and being dimensioned to provide a low resistance friction fit for the transistor lead; said transistor ends of the coaxial cables being supported in a trefoil cluster with the cable axes substantially parallel to each other; said cables being further arranged so that the center conductors of the cables have substantially the same spacing as the connecting leads; an energy source coupled to the remote end of one of said cables; and means to actuate said transistor coupled to the remote end of another of said cables; and means to couple a load to the remote end of another of said cables.

2. The switch of claim 1 in which the transistor is encapsulated in a type JEDEC TO-18 case and the coaxial cables are semirigid coaxial cables having an outside diameter of .085 inches.

3. The apparatus of claim 1 in which the transistor has base, collector and emitter elements and in which the base element is coupled to the actuating means through one of the coaxial cables, the collector element is coupled to the energy source through a second of the coaxial cables and the emitter element is connected directly to the load through a third of said coaxial cables.

4. A mount for a transistor containing three leads arranged in a triangular configuration, said mount comprising an electrically conducting mounting member; a cluster of coaxial cables mechanically supported near one end of each cable by said mounting member, said cluster including three coaxial cables arranged in a trefoil configuration; said coaxial cables each having an outside diameter substantially equal to the smallest spacing between the transistor leads; said cables being trimmed so that their supported ends lie in a common plane; said cables having their outer conductors in electrical contact with said mounting member; said cables having inner conductors with diameters greater than the diameters of the transistor leads; each of said inner conductors having an axial bore at their supported cable ends dimensioned to receive a transistor lead with a low resistance friction fit.